United States Patent [19]

Shimada et al.

[11] 3,920,665
[45] Nov. 18, 1975

[54] BERBINE COMPOUNDS

[75] Inventors: Fumitake Shimada, Iwatsuki;
Tetsuro Ikekawa, Narashino;
Kooichi Tachibana, Ohmiya; Tomio Endo, Kobe; Tetsuo Kohno, Urawa;
Hideo Kuroda, Urawa; Yoshiaki Ikeda, Tokyo; Yoshimi Okazaki, Tokyo; Yoshio Sawa, Nishinomiya, all of Japan

[73] Assignees: Kanebo, Ltd., Tokyo; Tetsuro Ikekawa, Chiba, both of Japan

[22] Filed: Sept. 28, 1973

[21] Appl. No.: 401,690

[30] Foreign Application Priority Data
June 25, 1973 Japan................................ 48-71468
Oct. 19, 1972 Japan.............................. 47-104645
Sept. 4, 1973 Japan................................ 48-99647
Sept. 4, 1973 Japan................................ 48-99646

[52] U.S. Cl...... 260/286 Q; 260/286 R; 260/289 C; 260/289 A; 424/258
[51] Int. Cl.².................................... C07D 215/20
[58] Field of Search......... 260/289 R, 289 C, 286 Q

[56] References Cited
OTHER PUBLICATIONS
Manske; The Alkaloids; Vol. IX, pp. 55, 75, 81, 1967.

*Primary Examiner*—Donald G. Daus
*Assistant Examiner*—Mary Vaughn
*Attorney, Agent, or Firm*—James C. Haight

[57] ABSTRACT

Novel berbine derivatives of the formula:

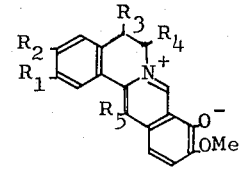

wherein $R_1$ and $R_2$ are each a methoxy group or jointly a methylenedioxy group, $R_3$ and $R_4$ are each a hydrogen atom or jointly a direct bond, and $R_5$ represents a lower alkyl, lower alkoxy or allyl group with the proviso that when $R_1$ and $R_2$ are each a methoxy group and $R_3$ and $R_4$ are each a hydrogen atom, $R_5$ cannot represent a methyl group; or pharmaceutically acceptable acid-addition salts thereof. The compounds inhibit the growth of transplanted sarcoma strain in mice.

10 Claims, No Drawings

BERBINE COMPOUNDS

This invention relates to novel berbine derivatives of the Formula II:

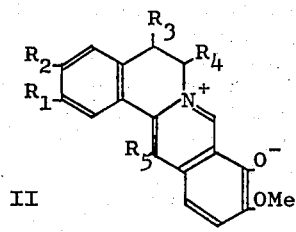

II wherein $R_1$ and $R_2$ represent each a methoxy group or jointly a methylenedioxy group, $R_3$ and $R_4$ represent each a hydrogen atom or jointly represent a direct bond, and $R_5$ represents a lower alkyl, lower alkoxy or allyl group, with the proviso that when $R_1$ and $R_2$ represent each a methoxy group and $R_3$ and $R_4$ represent each a hydrogen atom, $R_5$ cannot represent a methyl group, and pharmaceutically acceptable acid-addition salts thereof. The invention also relates to a process for preparing the same.

According to the present invention, the compounds of Formula II may be prepared by heating a compound of Formula I:

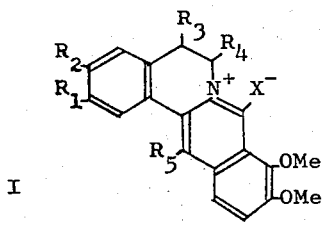

I wherein $R_1$, $R_2$, $R_3$, $R_4$ and $R_5$ are as defined above and $X^-$ represents an anion, in an inert medium.

The reaction proceeds at an elevated temperature, preferably above 140°C in the atmosphere of an inert gas such as nitrogen or carbon dioxide, or in a liquid inert medium such as liquid paraffin.

The products thus produced which have a betaine structure as shown in Formula II may be converted into their pharmaceutically acceptable acid-addition salts by conventional means.

For example, the betaine of the Formula II is dissolved in a solvent such as methanol or ethanol and an alcoholic solution of a nontoxic acid is added thereto, whereby crystals of the acid-addition salt may be obtained.

Examples of suitable acids are inorganic acids such as hydrohalic acid, nitric acid, sulfuric acid or phosphoric acid; and organic acids such as acetic acid, propionic acid, butyric acid, fumaric acid, maleic acid, citric acid, oxalic acid, tartaric acid, succinic acid or methanesulfonic acid.

Alternatively, the compounds II and the acid addition salts thereof may be prepared by reacting a compound I with an organic base. The reaction may be carried out by either refluxing the mixture of compound I with an amine or urea or heating the said mixture at an elevated temperature of 150° – 200°C, preferably a temperature of 170° – 190°C in a sealed tube or in a nitrogen atmosphere.

As the organic base, triethylamine, tributylamine, aniline, pyridine, diethanolamine, triethanolamine or urea, for example, may be employed.

The starting compounds of the formula I are 13-substituted berberines or palmatines, or their 5, 6-dehydro analogues.

The compound I wherein $R_5$ is an alkyl or allyl may be prepared by alkylating 8-acetonylberberine, 8-acetonylpalmatine or their 5, 6-dehydro derivatives with an alkylating agent such as an alkyl halide, dialkylsulfate, alkyl magnesium halide or allyl halide. The starting compounds of Formula I wherein $R_5$ is an alkoxy may be prepared by first oxidizing the 8-acetonyl compounds to give the corresponding 13-hydroxy compounds and then alkylating the resultant 13-hydroxy compounds. As the oxidizing agent, potassium permanganate may be used. The demethylation reaction of compound I to give compound II of the present invention most conveniently takes place in the form of the chloride. With other halides such as the iodide or bromide, the reaction requires higher temperatures than with the chloride as well as causing the formation of byproducts. Preferably, they may be converted into the chloride by reacting with acetone in an alkaline medium and treating the resulting 8-acetonyl compound with hydrochloric acid. The conversion may also be carried out by metathesis with silver chloride. The starting compound I having an alkoxy substituent at the 13-position tends to give the corresponding 13-hydroxybetaine III as a by-product during the demethylation reaction.

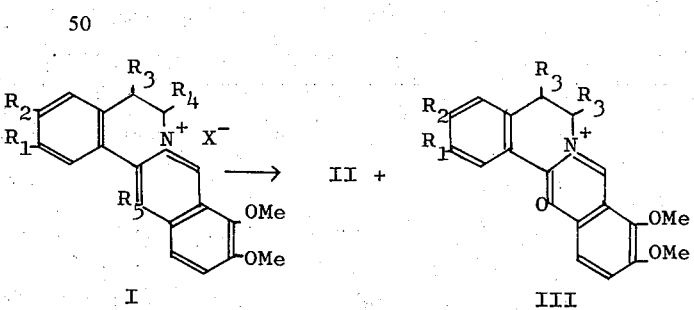

The reaction mixture containing compound III may be conveniently purified by means of a column chromatogram. Identification of compound II can be easily achieved by treating with concentrated nitric acid, whereby compound II gives a 9, 10-dioxoberbinium nitrate of the formula:

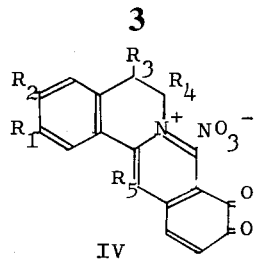

IV whereas the by-product III does not.

The novel compounds of the present invention effectively inhibit the growth of transplanted sarcoma strain in mice. For example, sarcoma strain 180 was transplanted into peritoneum of mice and the test compound was administered intraperitoneally to mice once a day for 5 consecutive days. After 1 week, accumulated abdominal ascites was collected and the total volume of sarcoma cells was compared with that obtained from untreated control animals.

The results obtained are shown in the following table.

| Compound | Dose | Inhibitory rate |
|---|---|---|
| 13-methylberberrubine | 5 × 30mg/kg/day | 100% |
| The hydrochloride | do. | 97% |
| The phosphate | do. | 100% |
| 13-ethylberberrubine | do. | 61.6% |
| The phosphate | do. | 64.0% |
| 13-methoxyberberrubine | do. | 92.8% |
| The hydrochloride | do. | 90.2% |
| 5,6-dehydro-13-methyl palmatrabine | | |
| 13-methyl-2,3,10-trimethoxyberbine | do. | 100% |
| The hydrochloride | do. | 96% |
| The nitrate | do. | 94.2% |
| The phosphate | do. | 100% |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

13-methylberberrubine 1g of 13-methylberberine chloride, prepared from 13-methylberberine iodide via 8-acetonyl-13-methylberberine, was suspended in liquid paraffin. The suspension was heated in a nitrogen atmosphere at 190°C for 4 hours. The resulting precipitates were collected, extracted with benzene-chloroform (2:1) and the extract was condensed. The residue was recrystallized from chloroform-hexane whereby 0.4g of red crystals 13-methylberberrubine melting at 268° – 270°C with decomposition was obtained. The product showed a single spot Rf of about 0.65 on a thin layer chromatogram thereof (Silica gel G, methanol: water=3:1), and was identified by N.M.R.

2.0g of the above product was dissolved in a methanolic solution of hydrogen chloride and the solution was condensed. The resulting crystals were recrystallized from methanol, whereby 1.6g of yellow crystals of 13-methylberberrubine hydrochloride melting above 300°C (darkening at 260°C) was obtained.

In like manner, the following acid-addition salts were prepared.

Nitrate, m.p. 276° – 280°C (with decomposition);
Sulfate, m.p. 282° – 285°C (with decomposition);
Phosphate, m.p. 226° – 230°C (with decomposition).

EXAMPLE 2

13-ethylberberrubine 2g of 13-ethylberberine chloride, prepared from 13-ethylberberine iodide via 8-acetonyl-13-ethylberberine, was suspended in liquid paraffin. The suspension was heated in a nitrogen atmosphere at 190°C for 3 hours. The resulting precipitates were collected, extracted with benzene-chloroform (2:1) and the extract was condensed. The residue was recrystallized from chloroform-hexane, whereby 1.2g of red crystals of 13-ethylberberrubine melting at 240° – 242°C with decomposition was obtained. The product showed a single spot Rf of about 0.72 on thin layer chromatogram thereof (Silica gel G, methanol:water=3:1), and was identified by N.M.R.

Hydrochloride m.p. 270° – 276°C (with decomposition),
Hydrobromide m.p. 254° – 258°C (with decomposition),
Hydroiodide m.p. 241° – 244°C (with decomposition),
Phosphate m.p. 232° – 235°C (with decomposition).

EXAMPLE 3

13-propylberberrubine 2.0g of 13-propylberberine chloride was suspended in liquid paraffin. The suspension was heated in a nitrogen atmosphere at 190°C for 3 hours. The resulting precipitates were collected and dissolved in methanol. The solution was filtered to remove insoluble matter and methanolic hydrogen chloride solution was added to the filtrate. The mixture was condensed and the resulting orange crystals were recrystallized from methanol, whereby 0.52g of yellow crystals of 13-propylberberrubine hydrochloride melting at 282° – 285°C with decomposition was obtained.

Nitrate m.p. 254° – 258°C (with decomposition),
Hydroiodide m.p. 247° – 251°C (with decomposition),
Phosphate m.p. 223° – 225°C (with decomposition).

In like manner, the following compounds were prepared: 13-allylberberrubine m.p. 241° – 243°C (with decomposition), the hydrochloride m.p. 236° – 237°C (with decomposition), and the phosphate m.p. 223° – 225°C (with decomposition); 13-ethyl-palmatrubine m.p. 218° – 220°C (with decomposition) and the hydrochloride m.p. 215° – 217°C (with decomposition); 13-allyl palmatrubine m.p. 224° – 225°C (with decomposition), the hydrochloride m.p. 224° – 225°C (with decomposition), the nitrate m.p. 210° – 211°C (with decomposition), and the phosphate m.p. 200° – 202°C (with decomposition).

EXAMPLE 4

13-methoxyberberrubine 2g of 13-methoxyberberine chloride was suspended in liquid paraffin. The suspension was heated in a nitrogen atmosphere at 160°C for 5 hours. The reaction mixture was cooled to room temperature and the resulting precipitates were collected. The precipitates were dissolved in chloroform and the solution was filtered. The filtrate was condensed to about 5 ml and the condensate was poured onto a column (24 × 250mm)

filled with alumina. The column was developed with a methanol-benzene mixture, whereby 172mg of crude crystals of 13-methoxy-berberrubine was obtained. As a by-product, 424mg of crude crystals of 13-hydroxyberberine and 157g of the starting 13-methoxyberberine chloride were recovered. The crude crystals were recrystallized from chloroform-hexane, whereby 134mg of deep red crystals of 13-methoxyberberrubine melting at 233° – 237°C with decomposition was obtained.

Analysis: Caluculated for $C_{20}H_{17}NO_5$: C,68.37; H,4.88; N,3.99. Found: C,68.40; H,4.92; N,3.91. Hydrochloride m.p. 228° – 230°C (with decomposition), Nitrate m.p. 212° – 214°C (with decomposition), Sulfate m.p. 207° – 208°C (with decomposition), Phosphate m.p. 201° – 202°C (with decomposition).

In like manner the following compounds were prepared: 13-ethoxyberberrubine m.p. 230° – 231°C (with decomposition) and the hydrochloride 221° – 223°C (with decomposition); 13-methoxy palmatrubine m.p. 240° – 242°C (with decomposition), the hydrochloride m.p. 236° – 237°C (with decomposition), the hydrobromide m.p. 233° – 235°C (with decomposition) and the phosphate m.p. 231° – 233°C (with decomposition); 13-ethoxy palmatrubine m.p. 246° – 247°C (with decomposition) and the hydrochloride m.p. 240° – 242°C (with decomposition).

EXAMPLE 5

13-allyl-5,6-dehydroberberrubine 1g of 13-allyl-5,6-dehydroberberine chloride was suspended in liquid paraffin. The suspension was heated in a nitrogen atmosphere at 170°C for 4 hours. The reaction mixture was cooled to room temperature and the resulting precipitates were collected. The precipitates were extracted with benzene-chloroform mixture (2:1) and the extract was condensed, whereby 0.4g of reddish crystals of 13-allyl-5,6-dehydroberberrubine melting at 227° – 230°C with decomposition was obtained.

Hydrochloride m.p. 220° – 221°C (with decomposition),
Hydrobromide m.p. 211° – 213°C (with decomposition),
Hydroiodide m.p. 215° – 217°C (with decomposition),
Phosphate m.p. 198° – 200°C (with decomposition).

In like manner the following compounds were prepared: 13-methyl-5,6-dehydroberberrubine m.p. 217° – 219°C (with decomposition), the hydrochloride m.p. 214° – 216°C (with decomposition), the bisulfate m.p. 207° – 209°C (with decomposition) and the phosphate m.p. 200° – 202°C (with decomposition); 13-ethyl-5, 6-dehydroberberrubine m.p. 222° – 223°C (with decomposition) and the hydrochloride m.p. 220° – 222°C (with decomposition) 13-methoxy-5, 6-dehydroberberrubine m.p. 203° – 205°C (with decomposition) and the nitrate m.p. 198° – 200°C (with decomposition); 13-ethoxy-5, 6-dehydroberberrubine m.p. 203° – 205°C (with decomposition).

EXAMPLE 6

5, 6-dehydro-13-methyl palmatrubine:

1g of 5,6-dehydro-13-methylpalmatine chloride was suspended in liquid paraffin. The suspension was heated in a nitrogen atmosphere at 160°C for 5 hours. The reaction mixture was cooled to room temperature and the resulting precipitates were collected. The precipitates were extracted with benzene-chloroform mixture (2:1) and the extract was condensed, whereby 0.3g of deep red crystals of 5,6-dehydro13-methyl palmatrubine melting at 240° – 242°C with decomposition was obtained.

Hydrochloride m.p. 230° – 233°C (with decomposition),
Nitrate m.p. 219° – 221°C (with decomposition),
Hydrobromide m.p. 226° – 228°C (with decomposition),
Phosphate m.p. 211° – 213°C (with decomposition).

In like manner, the following compounds were prepared:
5,6-dehydro-13-ethyl-palmaltrubine m.p. 233° – 235°C (with decomposition) and the hydrochloride m.p.
229° –231°C (with decomposition); 13-allyl-5, 6-dehydro-palmatrubine
m.p. 229° – 231°C (with decomposition), the hydrochloride
m.p. 219° – 221°C (with decomposition) and the phosphate m.p.
215° – 217°C (with decomposition);
5,6-dehydro-13-methoxypalmatrubine m.p.
225° – 227° (with decomposition), the phosphate m.p. 217° – 219°C (with decomposition) and the nitrate m.p. 220° – 221°C (with decomposition);
5,6-dehydro-13-ethoxy-palmatrubine
m.p. 221° – 223°C (with decomposition).

EXAMPLE 7

13-ethyl-palmatrubine hydrochloride 10g of 13-ethylpalmatine iodide and 20g of urea were mixed and heated in a nitrogen atmosphere with stirring at 180° – 190°C for 1 hour. To the reaction mixture was added 50 ml of methanol and 20 ml of 20% hydrochloric acid and the mixture was stirred for 10 minutes. The resulting crystals were filtered off, recrystallized from diluted hydrochloric acid twice and washed with chloroform. The crystals were twice recrystallized from diluted hydrochloric acid, whereby 4.0g of 13-ethylpalmatrubine hydrochloride melting at 215° – 217°C with decomposition was obtained.

The product was identical to that obtained in Example 3.

EXAMPLE 8

13-methylberberrubine hydrochloride

A mixture of 2g of 13-methylberberine iodide and 10 ml of triethanolamine was heated at 140° – 150°C for 2 hours with stirring and then cooled. The resulting crystals were filtered off, twice recrystallized from diluted hydrochloric acid and washed with chloroform. The crystals were then twice recrystallized from diluted hydrochloric acid, whereby 1.0g of 13-methylberberrubine hydrochloride melting above 300°C (darkening at 260°C) was obtained. The product was identical to that obtained in Example 1.

EXAMPLE 9

13-ethylberberrubine hydrochloride

A mixture of 2g of 13-ethylberberine iodide and 10 ml of triethylamine was refluxed for 5 hours and then cooled. The resulting crystals were filtered off, twice recrystallized from diluted hydrochloric acid and washed with chloroform. The crystals were then twice recrystallized from diluted hydrochloric acid, whereby 0.7g of yellow crystals of 13-ethylberberrubine hydrochloride melting at 270° – 276°C with decomposition was obtained. The product was identical to that obtained in Example 2.

Various other examples and modifications of the foregoing examples can be devised by the person skilled in the art after reading the foregoing disclosure and the appended claims without departing from the spirit and scope of the invention. All such further examples and modifications thereof are included within the scope of said claims.

What is claimed is:

1. A berbine compound of the formula:

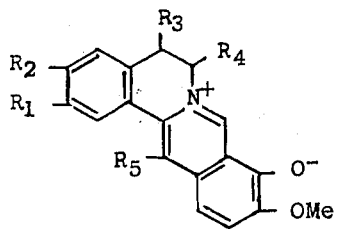

wherein $R_1$ and $R_2$ are each methoxy or jointly methylenedioxy; $R_3$ and $R_4$ are each hydrogen or jointly a covalent bond; and $R_5$ is alkyl of 1–3 carbon atoms, alkoxy of 1–3 carbon atoms or allyl, with the proviso that when $R_1$ and $R_2$ are each a methoxy and $R_3$ and $R_4$ are each hydrogen, $R_5$ is not methyl; or a pharmaceutically acceptable acid-addition salt thereof.

2. A compound according to claim 1, a 13-lower alkyl or allyl-berberrubine or a pharmaceutically acceptable acid-addition salt thereof.

3. A compound according to claim 1, a 13-lower alkoxy-berberrubine or a pharmaceutically acceptable acid-addition salt thereof.

4. A compound according to claim 1, a 13-ethyl, propyl or allyl-palmatrubine or a pharmaceutically acceptable acid-addition salt thereof.

5. A compound according to claim 1, a 13-lower alkoxy-palmatrubine or a pharmaceutically acceptable acid-addition salts thereof.

6. A compound according to claim 1, a 13-lower alkyl or allyl-5, 6-dehydroberberrubine or a pharmaceutically acceptable acid-addition salt thereof.

7. A compound according to claim 1, a 13-lower alkoxy-5,6-dehydroberberrubine or a pharmaceutically acceptable acid-addition salt thereof.

8. A compound according to claim 1, a 13-lower alkyl or allyl-5,6-dehydropalmatrubine or a pharmaceutically acceptable acid-addition salt thereof.

9. A compound according to claim 1, a 13-lower alkoxy-5,6-dehydropalmatrubine or pharmaceutically acceptable acid-addition salt thereof.

10. A compound according to claim 1, 13-methylberberrubine or a pharmaceutically acceptable acid-addition salt thereof.

* * * * *